Nov. 21, 1939. J. W. GARDNER 2,180,806
CANISTER CONTAINER
Filed Aug. 6, 1938
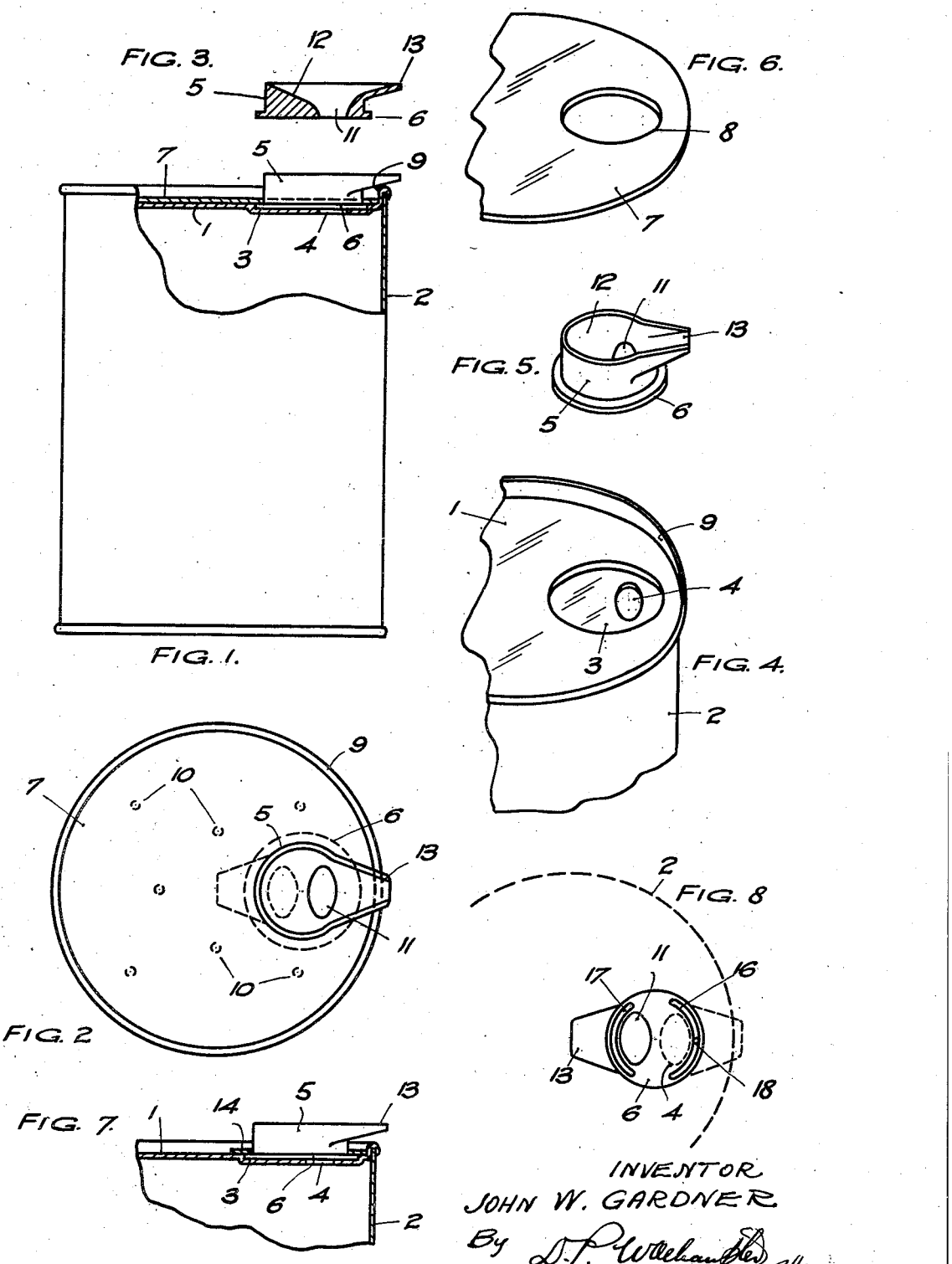
INVENTOR
JOHN W. GARDNER
By D. P. Wolehauser Atty.

Patented Nov. 21, 1939

2,180,806

UNITED STATES PATENT OFFICE 2,180,806

CANISTER CONTAINER

John Wilfred Gardner, Liverpool, England

Application August 6, 1938, Serial No. 223,534
In Great Britain January 12, 1938

5 Claims. (Cl. 221—19)

This invention relates to an improved construction of canister for powders or granular material, whether of cylindrical drum or other shape, and whether of composite cardboard and tin-plate construction or made entirely of sheet metal.

According to the present invention, a canister container is provided with a lid having a recess, an outlet aperture in the lid recess, a pouring spout, a flange on the base of the pouring spout, said spout flange being movably mounted in the lid recess, a disc secured on the lid, an aperture in said disc through which the spout projects, the rim of said disc aperture projecting over the spout flange to retain the spout on the lid, and an outlet aperture in the pouring spout base registering with the outlet aperture in the lid recess when the spout is moved to an operative pouring position, and being out of register with the outlet aperture in the lid recess when the pouring spout is moved to an inoperative position.

Means are preferably provided for preventing accidental movement of the spout from an inoperative position as may occur during transport.

The spout may be retained in position on the lid by means of a disc extending over the whole of the lid, the disc being secured in position as by means of tongues punched up from the lid and riveted in the disc.

In the accompanying drawing:

Fig. 1 is an elevation partly in section showing the invention applied to a cylindrical drum canister, Fig. 2 being a plan and Fig. 3 a vertical section through the pouring spout.

Fig. 4 is a fragmentary perspective view of the canister lid showing the recess for the spout.

Fig. 5 is a perspective view of the spout and

Fig. 6 a fragmentary perspective view of the apertured retaining disc insert.

Fig. 7 is a fragmentary vertical section of a modified construction in which the spout is retained on the lid by a ring, and Fig. 8 is an inverted plan of a pouring spout having means for preventing accidental uncovering of the pouring aperture during transport.

In the construction illustrated in Figs. 1 to 6 the sheet metal lid 1 of the canister 2 is formed with a circular depression or recess 3 in the base of which is an eccentrically disposed aperture 4; a pouring spout 5, which may be moulded from synthetic resin, is inserted into the recess, a circular flange 6 at the base of the spout fitting the recess. A cardboard disc insert 7 of the size of the canister lid is then positioned over the spout to enclose the flange in the recess, a circular aperture 8 in the disc fitting closely round the smaller neck of the spout and providing an annular lip extending over the flange. The disc may be held in position on the lid to retain the spout either by its periphery being snapped past an annular ridge 9 on the lid or be otherwise secured, as by means of tongues 10 punched up from the lid and riveted in the disc. In the spout is formed a vertical hole 11, also eccentrically disposed, leading from the base to a recess 12 in the top of the spout, one side of the spout terminating in a lip 13. The recess 3 in the canister lid is preferably disposed near the side so that when the spout is turned to the position shown in full lines, Fig. 2, with its lip projecting slightly over the rim of the canister, the hole 11 in the spout registers with the pouring aperture 4 in the head 1 and the contents may then be freely poured out. When the lip of the spout is turned towards the centre of the canister—to the position shown in dotted lines—the pouring aperture is shut off. By forming the recess 12 in the top of the spout any of the contents left therein, falls back immediately after pouring into the container through the apertures in the spout and lid.

In a modification the spout may be retained revolubly on the lid by means of a narrow ring 14, Fig. 7, secured to the lid in any suitable manner and engaging over the shoulder 6 on the spout.

In order to prevent the spouts of canisters working round during transport from a closed position, indicated in full lines Fig. 8, to an open position, indicated in dotted lines, which movement might accidentally occur owing to vibration set up by the transport vehicle or other cause, the undersurface of the spout may be formed with two separated concentrically curved grooves 16, 17, a nib 18 being pressed up from the metal of the lid 1 in such a position that it will register with and engage one or other of the grooves 16, 17 when the spout is positioned in the recess 3. When in the closed position shown in Fig. 8 with the nib 18 engaging the groove 16, the spout will be prevented from rotating outwardly to such an extent as would uncover the lid aperture 4 because the ends of the groove 16 will be engaged by the nib 18 thus limiting the angular displacement which could be caused accidentally, so preventing uncovering of the aperture 4 and preventing loss of material during transport. When it is required to turn the spout to an operative position uncovering the aperture 4, this may be effected manually by giving the spout a sharp twist causing the nib 18 to ride out past one or other end of the slot 16 and mount the intervening ridge until it enters the slot 17, when the apertures 4, 11 may be brought more or less into register and enable the contents to be poured.

The spout instead of being moulded of synthetic resin or made solid may itself be formed as a hollow sheet metal pressing or stamping, the top of the spout being completely open but the base having an eccentric aperture adapted to register with that in the recess in the canister lid when the spout is turned to the operative position.

The term disc in the description and claims is intended to include not only parts of circular shape but also other plate-like members of square, rectangular or other shape.

I claim:

1. In a canister container, a lid having a recess, an outlet aperture in the lid recess, a pouring spout, a flange on the base of the pouring spout, said spout flange having its upper face flush with the upper surface of the lid and being movably mounted in the lid recess, a flat disc secured on the lid, an aperture in said disc through which the spout projects, the rim of said disc aperture projecting over the spout flange to retain the spout on the lid, and an outlet aperture in the pouring spout base registering with the outlet aperture in the lid recess when the spout is moved to an operative pouring position, and being out of register with the outlet aperture in the lid recess when the pouring spout is moved to an inoperative position.

2. In a canister container, a lid having a circular recess, an eccentrically disposed outlet aperture in the lid recess, a pouring spout, a circular flange on the base of the pouring spout, said spout flange having its upper face flush with the upper surface of the lid and being rotatably mounted in the lid recess, a flat disc secured on the lid, an aperture in said disc through which the spout projects, the rim of said disc aperture projecting over the spout flange to retain the spout on the lid, and an eccentrically disposed outlet aperture in the pouring spout base, said pouring spout aperture registering with the outlet aperture in the lid recess when the spout is rotated to an operative pouring position, and being out of register with the outlet aperture in the lid recess when the pouring spout is rotated to an inoperative position.

3. A canister container according to claim 2, in which the apertured disc extends over the whole top surface of the canister lid.

4. A canister container according to claim 2, in which the apertured disc is in the form of a narrow ring.

5. In a canister container, a lid having a circular recess near one side, an eccentrically disposed outlet aperture in the lid recess, a pouring spout, a circular flange on the base of the pouring spout, said spout flange being rotatably mounted in the lid recess, a disc secured on the lid, an aperture in said disc through which the spout projects, the rim of said disc aperture projecting over the spout flange to retain the spout on the lid, an eccentrically disposed outlet aperture in the pouring spout base, said pouring spout aperture registering with the outlet aperture in the lid recess when the spout is rotated to an operative pouring position, and being out of register with the outlet aperture in the lid recess when the pouring spout is rotated to an inoperative position, two separated and concentrically curved grooves on the undersurface of the spout flange, and a nib in the recess for registering with and engaging one or other of said grooves.

JOHN WILFRED GARDNER.